United States Patent
Liu et al.

(10) Patent No.: US 12,513,681 B2
(45) Date of Patent: Dec. 30, 2025

(54) DYNAMIC RESOURCES FOR SIDELINK COMMUNICATION

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 18/162,475

(22) Filed: Jan. 31, 2023

(65) Prior Publication Data
US 2024/0260022 A1 Aug. 1, 2024

(51) Int. Cl.
*H04W 72/11* (2023.01)
*H04L 5/16* (2006.01)
*H04W 72/1263* (2023.01)

(52) U.S. Cl.
CPC .............. *H04W 72/11* (2023.01); *H04L 5/16* (2013.01); *H04W 72/1263* (2013.01)

(58) Field of Classification Search
CPC . H04W 72/11; H04W 72/1263; H04W 72/02; H04W 72/20; H04W 76/14; H04L 5/16
See application file for complete search history.

(56) References Cited

U.S. PATENT DOCUMENTS

| | | | |
|---|---|---|---|
| 2023/0028810 A1 | 1/2023 | Ibrahim et al. | |
| 2023/0118247 A1* | 4/2023 | Lin | H04W 72/044 370/329 |
| 2023/0156785 A1* | 5/2023 | Yao | H04W 74/0808 370/329 |
| 2023/0262774 A1* | 8/2023 | Wu | H04W 28/0284 370/329 |
| 2023/0276474 A1* | 8/2023 | Mohammad | H04W 72/04 370/329 |
| 2023/0379912 A1* | 11/2023 | Ji | H04W 72/20 |

FOREIGN PATENT DOCUMENTS

WO WO-2022077332 A1 * 4/2022
WO WO-2022079526 A1 * 4/2022

OTHER PUBLICATIONS

International Search Report and Written Opinion—PCT/US2024/011227—ISA/EPO—May 21, 2024.

* cited by examiner

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a first user equipment (UE) may select one or more additional resources in a dynamic resource region for a second set of communications to a second UE, the one or more additional resources being in addition to one or more resources in a semi-static resource region for a first set of communications to the second UE. The UE may transmit, to the second UE, a request that the one or more additional resources be reserved for the second set of communications to the second UE. Numerous other aspects are described.

28 Claims, 12 Drawing Sheets

… (1)

DYNAMIC RESOURCES FOR SIDELINK COMMUNICATION

FIELD OF THE DISCLOSURE

Aspects of the present disclosure generally relate to wireless communication and to techniques and apparatuses for using dynamic resources for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include selecting one or more additional resources in a dynamic resource region for a second set of communications to a second UE, the one or more additional resources being in addition to one or more resources in a semi-static resource region for a first set of communications to the second UE. The method may include transmitting, to the second UE, a request that the one or more additional resources be reserved for the second set of communications to the second UE.

Some aspects described herein relate to a method of wireless communication performed by a second UE. The method may include receiving, from a first UE, a request that one or more additional resources in a dynamic resource region be reserved for a second set of communications from the first UE to the second UE, the one or more additional resources being in addition to one or more resources in a semi-static resource region for a first set of communications to the second UE. The method may include transmitting, to the first UE, a response to the request.

Some aspects described herein relate to a first UE for wireless communication. The first UE may include a memory and one or more processors coupled to the memory. The one or more processors may be configured to select one or more additional resources in a dynamic resource region for a second set of communications to a second UE, the one or more additional resources being in addition to one or more resources in a semi-static resource region for a first set of communications to the second UE. The one or more processors may be configured to transmit, to the second UE, a request that the one or more additional resources be reserved for the second set of communications to the second UE.

Some aspects described herein relate to a second UE for wireless communication. The second UE may include a memory and one or more processors coupled to the memory. The one or more processors may be configured to receive, from a first UE, a request that one or more additional resources in a dynamic resource region be reserved for a second set of communications from the first UE to the second UE, the one or more additional resources being in addition to one or more resources in a semi-static resource region for a first set of communications to the second UE. The one or more processors may be configured to transmit, to the first UE, a response to the request.

Some aspects described herein relate to a non-transitory computer-readable medium that stores a set of instructions for wireless communication by a first UE. The set of instructions, when executed by one or more processors of the UE, may cause the UE to select one or more additional resources in a dynamic resource region for a second set of communications to a second UE, the one or more additional resources being in addition to one or more resources in a semi-static resource region for a first set of communications to the second UE. The set of instructions, when executed by one or more processors of the UE, may cause the UE to transmit, to the second UE, a request that the one or more additional resources be reserved for the second set of communications to the second UE.

Some aspects described herein relate to a non-transitory computer-readable medium that stores a set of instructions for wireless communication by a second UE. The set of instructions, when executed by one or more processors of the UE, may cause the UE to receive, from a first UE, a request that one or more additional resources in a dynamic resource region be reserved for a second set of communications from the first UE to the second UE, the one or more additional resources being in addition to one or more resources in a semi-static resource region for a first set of communications to the second UE. The set of instructions, when executed by one or more processors of the UE, may cause the UE to transmit, to the first UE, a response to the request.

Some aspects described herein relate to an apparatus for wireless communication. The apparatus may include means for selecting one or more additional resources in a dynamic resource region for a second set of communications to another apparatus, the one or more additional resources being in addition to one or more resources in a semi-static resource region for a first set of communications to the other apparatus. The apparatus may include means for transmitting, to the other apparatus, a request that the one or more additional resources be reserved for the second set of communications to the other apparatus.

Some aspects described herein relate to an apparatus for wireless communication. The apparatus may include means for receiving, from another apparatus, a request that one or more additional resources in a dynamic resource region be reserved for a second set of communications from the other apparatus to the apparatus, the one or more additional resources being in addition to one or more resources in a semi-static resource region for a first set of communications to the apparatus. The apparatus may include means for transmitting, to the other apparatus, a response to the request.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
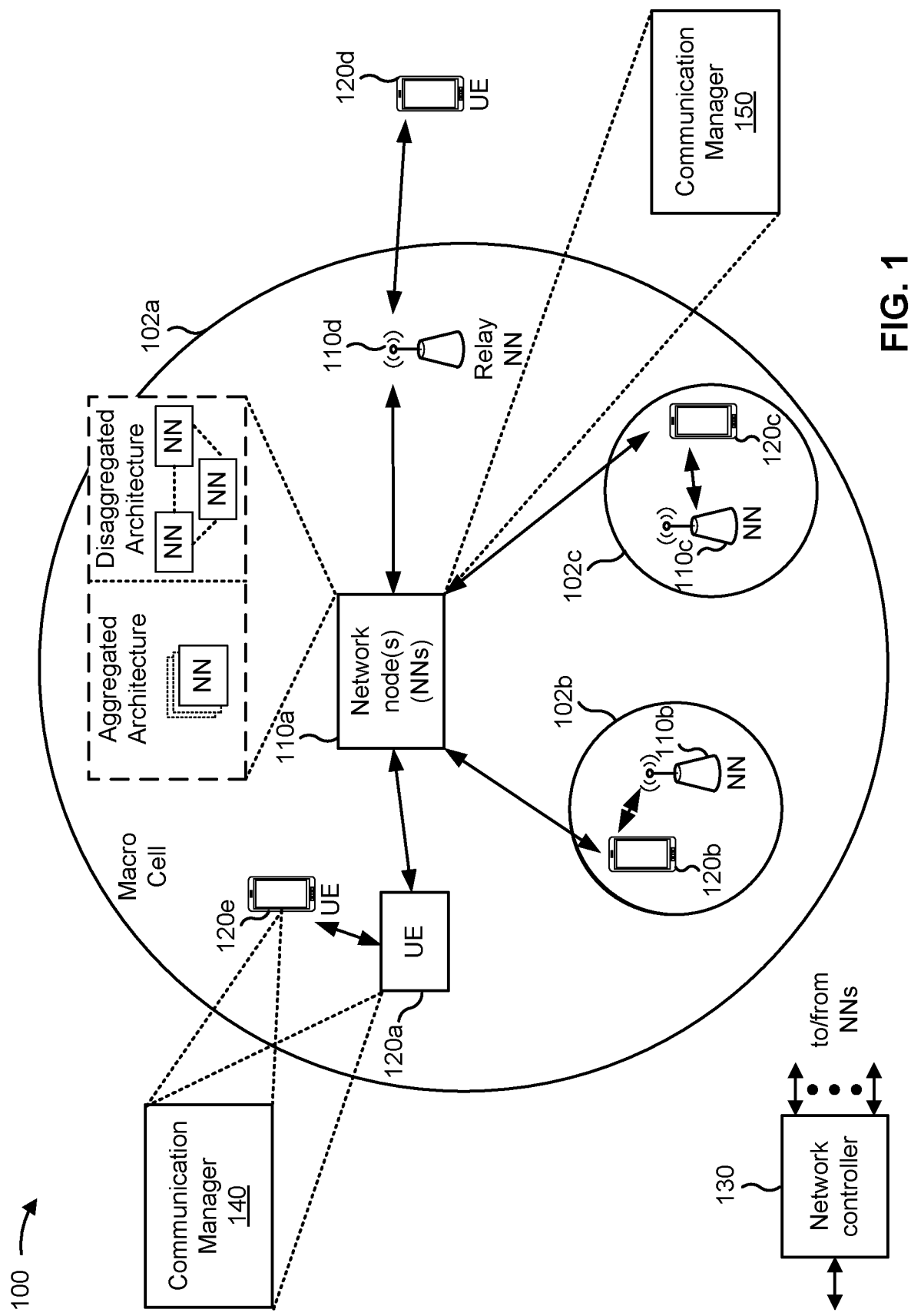
FIG. 1 is a diagram illustrating an example of a wireless network, in accordance with the present disclosure.

A user equipment (UE) may use sidelink resources to communicate with another UE. The sidelink resources may be semi-static resources that follow a configured pattern. With semi-static sidelink resources, a UE may know which beam to use to receive at a certain time, and there will be no error as to where a UE is transmitting. However, if there is no traffic from a first UE to a second UE, the allocated semi-static resources from the first UE to the second UE will be wasted.

According to various aspects described herein, a UE may allow more sidelink resources in a particular direction to be assigned when there is more traffic in that direction. The UE may split the timing resources into semi-static resources (in a semi-static resource region assigned to semi-static time resources) and dynamic resources (in a dynamic resource region assigned to dynamic time resources). The UE may use the semi-static resource region each time to maintain the connection, where the beam is fixed and the communication direction (half duplex pattern) is predetermined. The dynamic resource region may be used as necessary and may be shared across multiple connections. For example, if a transmitting UE needs more transmission resources, the transmitting UE may request (from a receiving UE) that one or more resources in the dynamic resource region be used for the rest of the data transmission. In this way, the quantity of semi-static resources for each link may be minimized and signaling resources further conserved. The semi-static resource region and/or the dynamic resource region may be located in frequency range 2 (FR2). In some aspects, the semi-static region and/or the dynamic region may be located in other frequency ranges, such as FR3, FR4, FR5, or higher frequency ranges.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations frequency range 1 (FR1) (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., a UE 120) may include a communication manager 140. As described in more detail elsewhere herein, the communication manager 140 may select one or more additional resources in a dynamic resource region for a second set of communications to a second UE, the one or more additional resources being in addition to one or more resources in a semi-static resource region for a first set of communications to the second UE. The communication manager 140 may transmit, to the second UE, a request that the one or more additional resources be reserved for the second set of communications to the second UE. Additionally, or alternatively, the communication manager 140 may perform one or more other operations described herein.

In some aspects, a second UE (e.g., a UE 120) may include a communication manager 140. As described in more detail elsewhere herein, the communication manager 140 may receive, from a first UE, a request that one or more additional resources in a dynamic resource region be reserved for a second set of communications from the first UE to the second UE, the one or more additional resources being in addition to one or more resources in a semi-static resource region for a first set of communications to the second UE; and transmit, to the first UE, a response to the request. Additionally, or alternatively, the communication manager 140 may perform one or more other operations described herein.

As indicated above, FIG. 1 is provided as an example. Other examples may differ from what is described with regard to FIG. 1.

Figure 2:
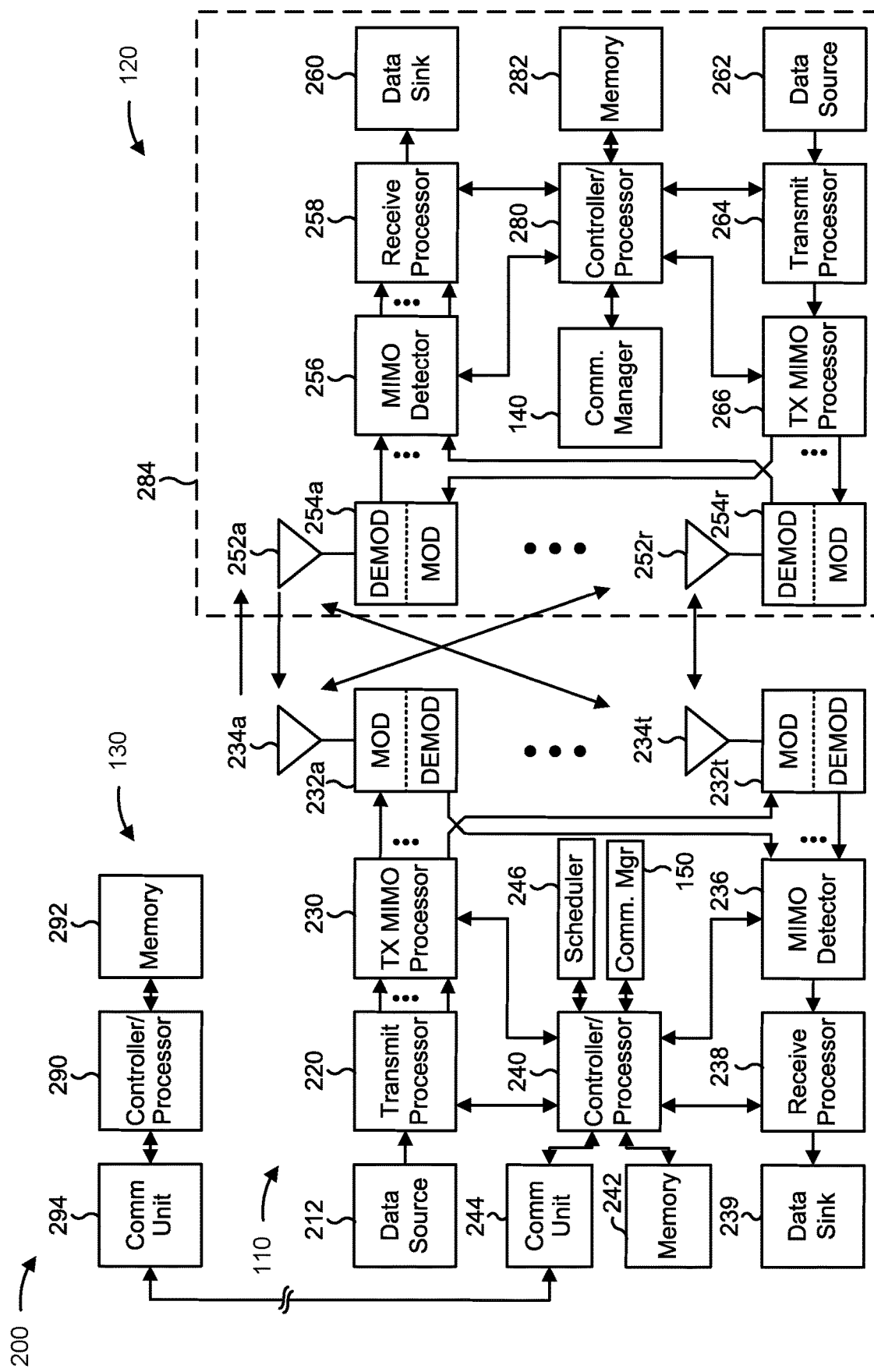
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor of a network entity (e.g., the controller/processor 240 of the network node 110), the controller/processor 280 of the UE 120, and/or any other component(s) of FIG. 2 may perform one or more techniques associated with using dynamic resources for sidelink communication, as described in more detail elsewhere herein. For example, the controller/processor 240 of the network node 110, the controller/processor 280 of the UE 120, and/or any other component(s) of FIG. 2 may 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a first UE (e.g., a UE 120) includes means for selecting one or more additional resources in a dynamic resource region for a second set of communications to a second UE, the one or more additional resources being in addition to one or more resources in a semi-static resource region for a first set of communications to the second UE; and/or means for transmitting, to the second UE, a request that the one or more additional resources be reserved for the second set of communications to the second UE. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., a UE 120) includes means for receiving, from a first UE, a request that one or more additional resources in a dynamic resource region be reserved for a second set of communications from the first UE to the second UE, the one or more additional resources being in addition to one or more resources in a semi-static resource region for a first set of communications to the second UE; and/or means for transmitting, to the first UE, a response to the request. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
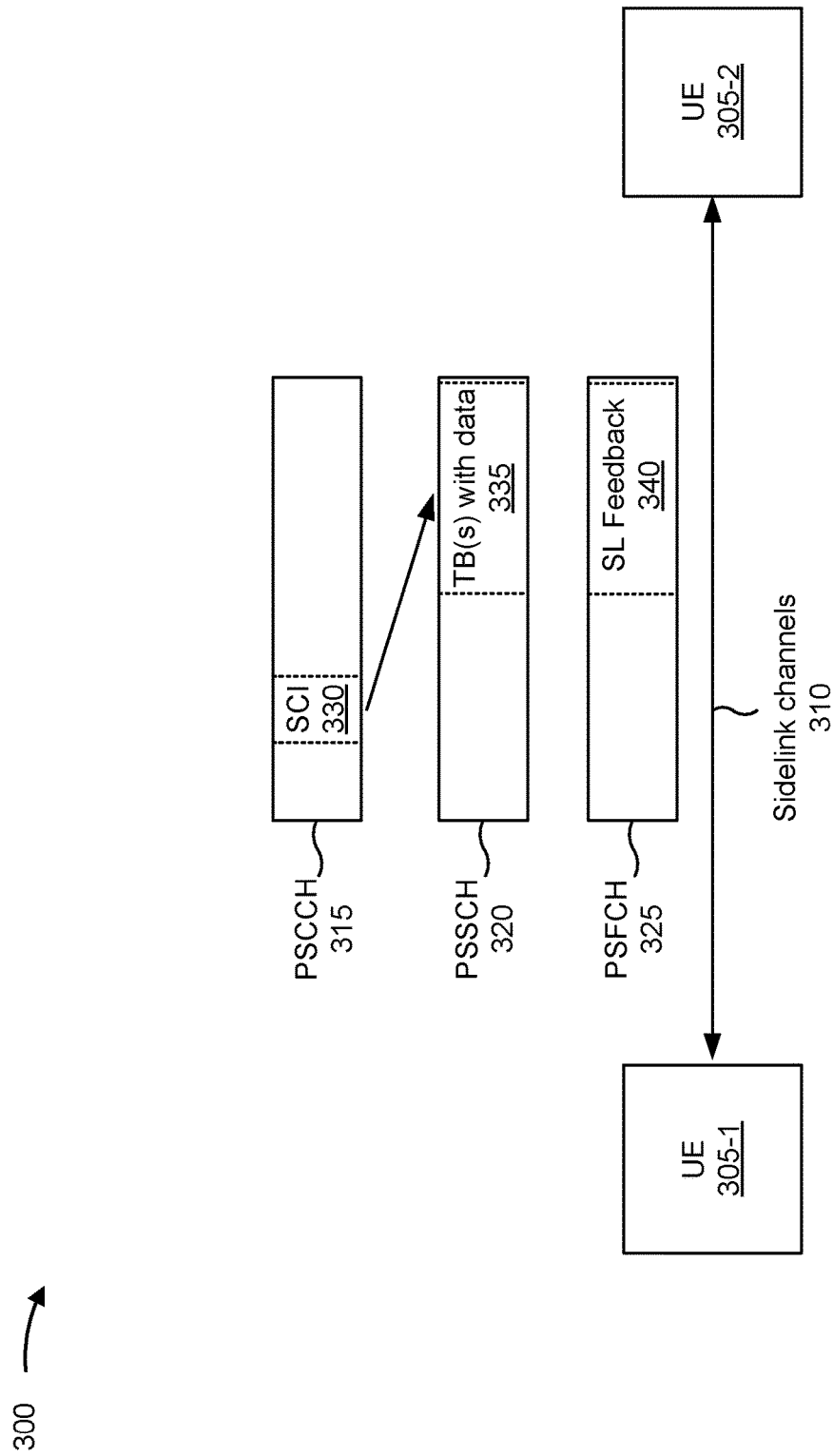
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
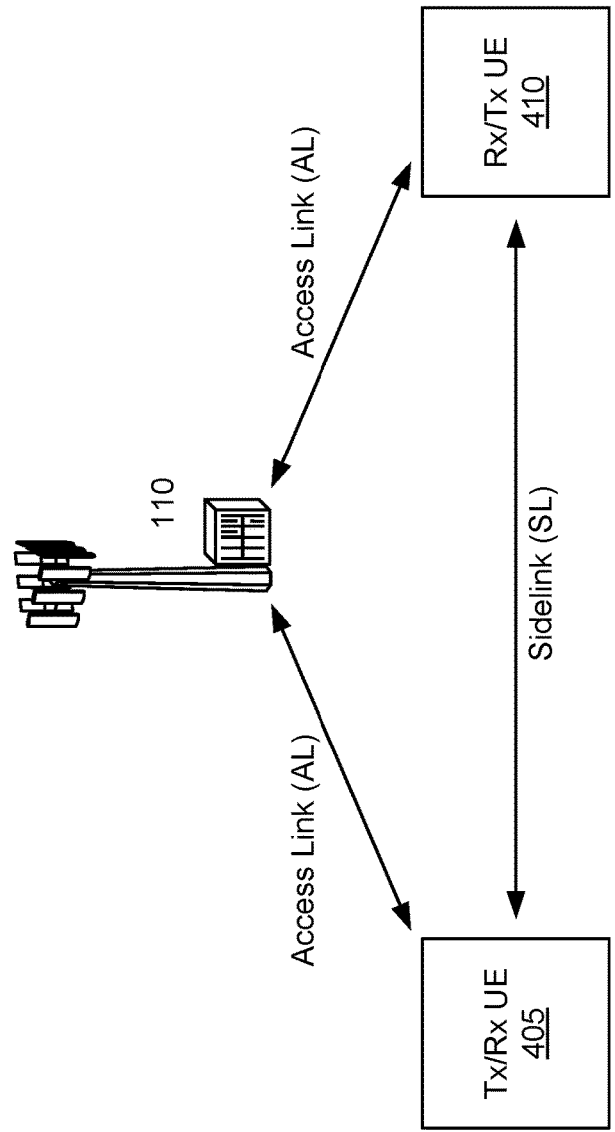
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 4. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

A UE 120 may use carrier aggregation for sidelink channels. Carrier aggregation is a technology that enables two or more component carriers (CCs, sometimes referred to as carriers) to be combined (e.g., into a single channel) for a single UE 120 to enhance data capacity. Carriers can be combined in the same or different frequency bands. Additionally, or alternatively, contiguous or non-contiguous carriers can be combined. A network node 110 may configure carrier aggregation for a UE 120, such as in an RRC message, DCI, and/or another signaling message.

In some aspects, carrier aggregation may be configured in an intra-band contiguous mode where the aggregated carriers are contiguous to one another and are in the same band. In some aspects, carrier aggregation may be configured in an intra-band non-contiguous mode where the aggregated carriers are non-contiguous to one another and are in the same band. In some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., DCI and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling. In some aspects, carrier aggregation may include multiple secondary carriers (without the primary). Some carrier aggregation configurations may provide for CC activation and deactivation, cross-carrier grants (grant for one carrier provide on another carrier), beam indications, and/or multi-bit feedback.

As indicated above, FIG. 4 is provided as an example. Other examples may differ from what is described with respect to FIG. 4.

Figure 5:
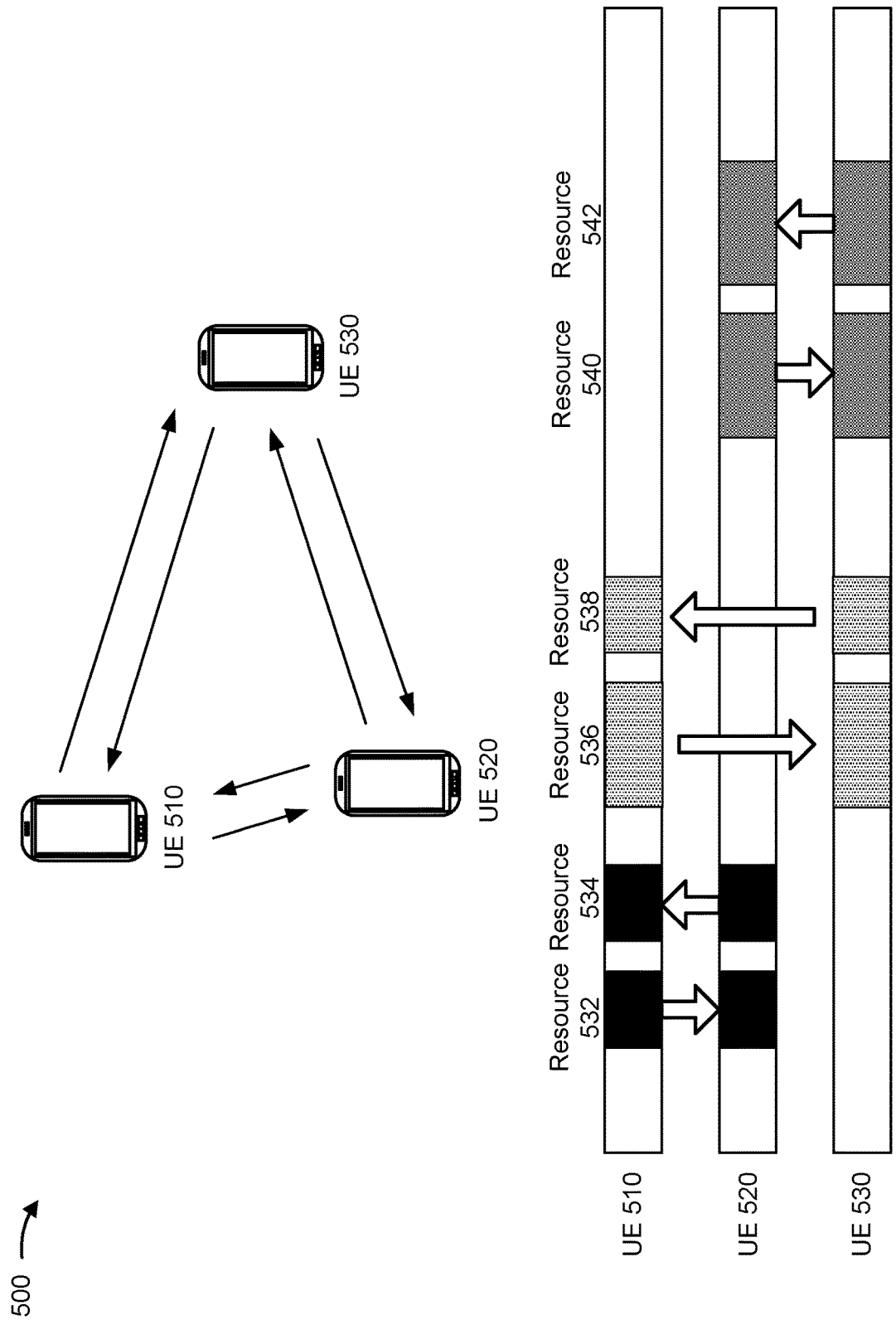
FIG. 5 is a diagram illustrating an example of sidelink communications, in accordance with the present disclosure.

FIG. 5 is a diagram illustrating an example 500 of sidelink communications, in accordance with the present disclosure.

For sidelink operation, a UE 510 (e.g., a UE 120) may be connected to one or multiple other UEs, such as UE 520 (e.g., a UE 120) and UE 530 (e.g., a UE 120) with unidirectional or bi-directional traffic. For FR1, multiple sidelink connections may not be an issue, as UE 510 can use an omni-directional antenna pattern to receive and select targeted signals from a received signal. However, for FR2, the operation is essentially point-to-point at any time, and beam issues may need to be resolved. For uplink, a network entity (e.g., a gNB) may schedule or configure uplink transmission with certain beams and reserve the network entity receive beam at the configured/scheduled time for reception. For downlink, the network entity does not have beam flexibility, at the cost that all UEs are pointing to the network entity and monitoring all the time.

For FR2, the multiple connections may become an issue under analog beam restriction. For a UE with a single panel, the UE cannot receive a signal from multiple directions. For example, in order to receive from an intended transmitting UE 520, receiving UE 510 may need to tune its receive beam towards the direction of the UE 520 and thus UE 510 cannot receive from another transmitting UE 530 in a different direction. That is, an issue is the selection of the beam that UE 510 is to use. Example 500 shows three UEs that actively communicate with each other while they are not in the same beam. It is not clear how multiple sidelinks are to be maintained in FR2 or millimeter wave (mmW) sidelink operations.

Example 500 also shows semi-static time resources that the UEs may use for sidelink communications. Given a set of UEs with multiple connections, the simplest way of communication is to dedicate resources at preset locations (times) with preset beams. If there is a connection between UE 510 and UE 520, and there is transmission from UE 510 to UE 520, semi-statically resources (in the time domain) may be configured such that UE 520 will receive in the resource and use a beam pointing to UE 510. UE 510 may not always need to transmit in the resource and may only need to transmit when there is traffic.

If PSFCH feedback is configured, for the PSFCH resource corresponding to the configured resource, UE 510 will monitor the PSFCH with a beam pointing to UE 520 if UE 510 transmitted to UE 520 in the corresponding PSCCH/PSSCH resource. There is a possible PSFCH association issue in that if one PSFCH occasion is associated with different slots with the PSSCH using different beams, it is hard to tell which beam the PSFCH should use. PSSCH resources may be assigned to correspond to the same PSFCH occasion in the same direction. If there is bi-directional transmission, both semi-static resources from UE 510 to UE 520 and from UE 520 to UE 510 are to be used. For a large network, it is possible to reuse the resource, at least for connections relatively far away from each other. In an example, UE 510 may use resource 532 for transmission to UE 520 and resource 534 for reception from UE 520. UE 510 may use resource 536 for transmission to UE 530 and resource 538 for reception from UE 530. UE 520 may use resource 540 for transmission to UE 530 and resource 542 for reception from UE 530.

With semi-static sidelink resources, a UE may know which beam to use to receive at a certain time, and there will be no error event where UE 510 is transmitting to UE 520 while UE 520 is not listening or is listening in a wrong direction. However, semi-static sidelink resources do not effectively adapt to connection variation and traffic variation. For example, if there is no traffic from UE 510 to UE 520, the allocated semi-static resources from UE 510 to UE 520 will be wasted.

As indicated above, FIG. 5 is provided as an example. Other examples may differ from what is described with regard to FIG. 5.

Figure 6:
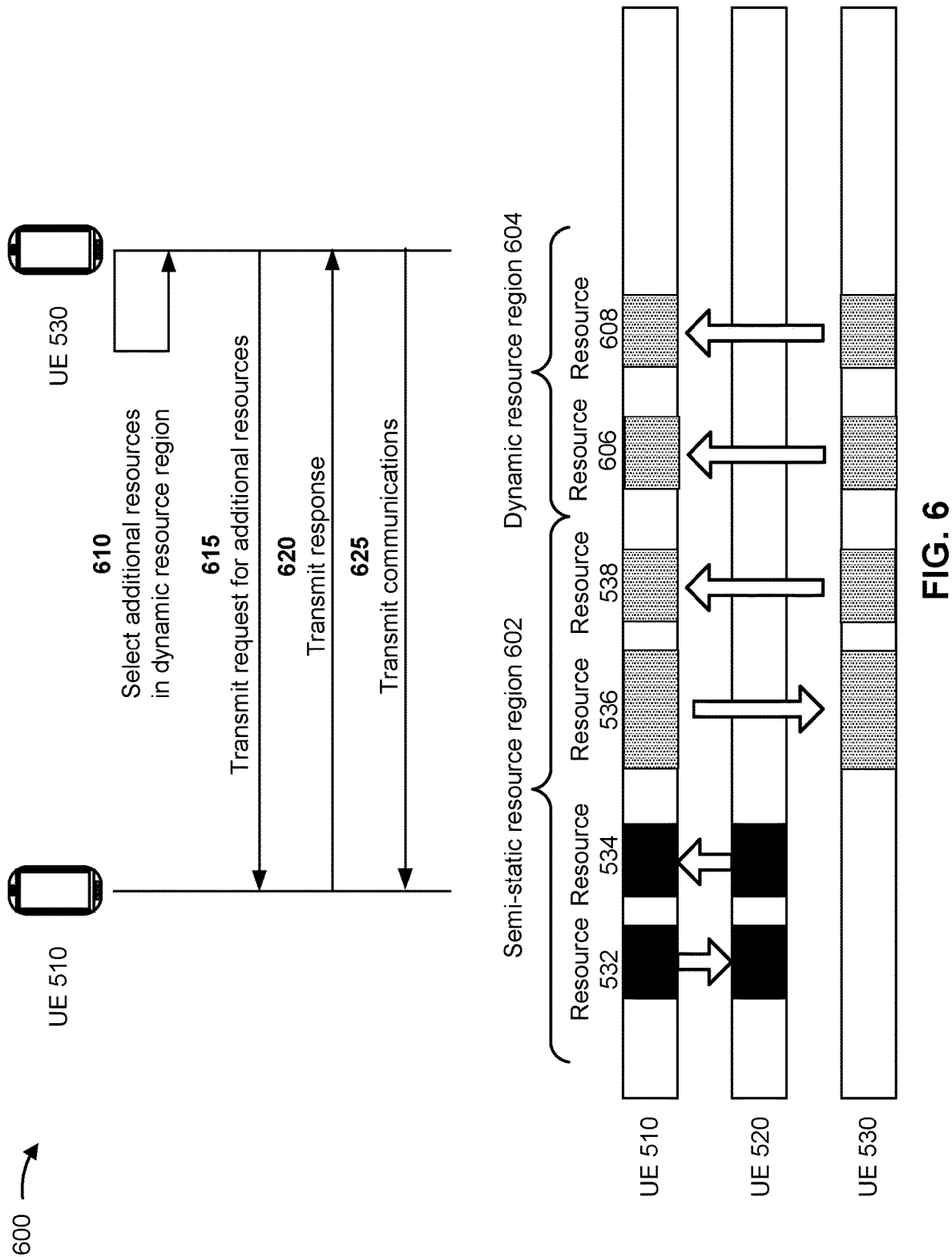
FIG. 6 is a diagram illustrating an example of using a dynamic resource region for sidelink communications, in accordance with the present disclosure.

FIG. 6 is a diagram illustrating an example 600 of using a dynamic resource region for sidelink communications, in accordance with the present disclosure.

According to various aspects described herein, a UE may allow more sidelink resources in a particular direction (beam) to be assigned when there is more traffic in that direction. The UE may split the timing resources into semi-static resources (in a semi-static resource region 602 assigned to semi-static time resources) and dynamic resources (in a dynamic resource region 604 assigned to dynamic time resources). The UE may use the semi-static resource region 602 each time to maintain the connection, where the beam is fixed and the communication direction (half duplex pattern) is predetermined. The dynamic resource region 604 may be used as necessary and may be shared across multiple connections. The semi-static resource region and/or the dynamic resource region may be located in FR2.

For example, if a data transmission is not completed for a connection (e.g., UE 530 to UE 510) within the semi-static resource region 602 dedicated to the connection, the data transmission may continue in the dynamic resource region 604. That is, if UE 530 needs more transmission resources, UE 530 may request (from UE 510) one or more resources in the dynamic resource region 604 be used for the rest of the data transmission. This may involve UE 530 selecting the one or more additional resources, such as resource 606 and resource 608 in the dynamic resource region 604, as shown by reference number 610, and transmitting a request for the one or more additional resources, as shown by reference number 615.

As shown by reference number 620, UE 510 may transmit a response. The UE 510 may indicate in the response that the request was accepted or rejected. The UE 510 may indicate in the response one or more proposed resources in the dynamic resource region 604 that are different than the one or more additional resources that were requested. As shown by reference number 625, UE 530 may transmit communications. UE 530 may use semi-static resources for a first set of communications (of a transmission) and the one or more additional resources (e.g., resource 606 and resource 608, or what was granted) in the dynamic resource region 604 for a second set of communications (of the transmission). A set of communications may include one or more communications. The first set of communications may include control information. The first set of communications may also include some amount of data. The second set of communications may include data. UE 530 may transmit the second set of communications in resources proposed by UE 510. By having dynamic resources available for sidelink (e.g., in FR2), UE 510 may have more flexibility in the selection of resources, and signaling resources are thus conserved.

In some aspects, UE 510 may only allow inter-UE coordination (IUC) message exchanges and a small quantity of data packets in the semi-static resources. The small quantity of data packets may include an amount of data that satisfies a threshold (e.g., maximum amount of data). This may include utilizing a mini-slot structure in the semi-static resources to reduce overhead. In this way, the quantity of semi-static resources for each link may be minimized and signaling resources further conserved. An IUC message may include a medium access control control element (MAC CE) carrying a PSSCH message or SCI-2 only in the PSSCH, either of which may not need a full slot.

As indicated above, FIG. 6 is provided as an example. Other examples may differ from what is described with regard to FIG. 6.

Figure 7:
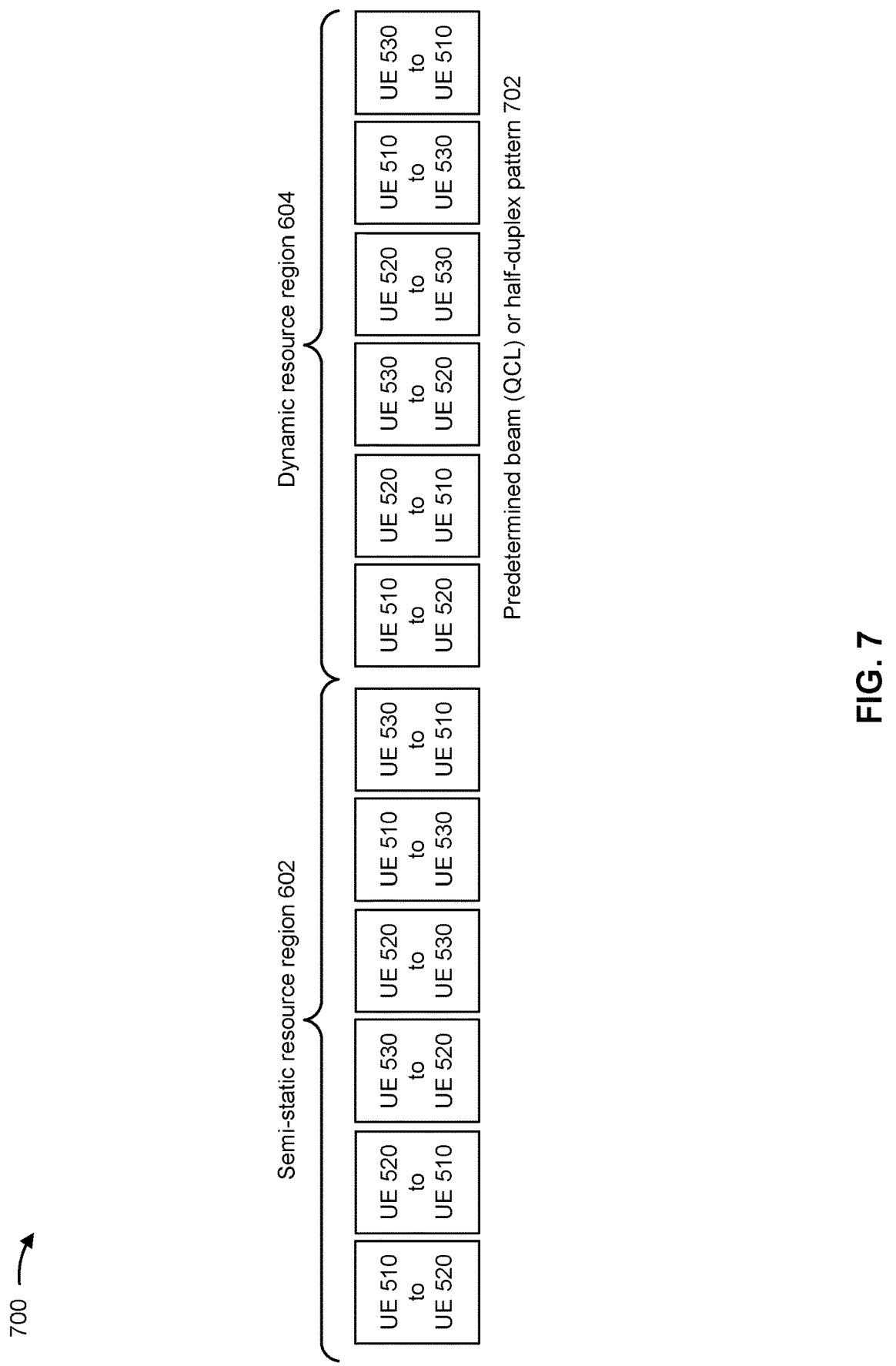
FIG. 7 is a diagram illustrating an example of a predetermined beam pattern or half-duplex pattern, in accordance with the present disclosure.

FIG. 7 is a diagram illustrating an example 700 of a predetermined beam pattern or half-duplex pattern, in accordance with the present disclosure.

In some aspects, for multiple links, a UE may be configured with semi-static resources that have a predetermined beam pattern and/or a predetermined half-duplex pattern. Example 700 shows an example of a predetermined beam or half-duplex pattern 702. A predetermined beam pattern may include a pattern of beam directions with a peak gain, main lobe attributes, and/or side lobe attributes. A predetermined half-duplex pattern may indicate transmission directions between UEs for each resource or time slot. Semi-static resources may be configured more infrequently (e.g., longer period between configurations) than dynamic resources, to minimize overhead. The quantity of slots/symbols for each link in the transmission and reception directions may be minimal (e.g., enough to maintain a link). However, to support higher throughput, dynamic resources may be used. Since the semi-static resources may be configured with a relatively long period between semi-static configurations, in order to minimize the scheduling delay when the packet arrives in the middle of the period, it may be better for the UE to use the dynamic resources sooner than the next semi-static reconfiguration.

There may be multiple links from a UE, whether to the same UE or to multiple UEs. In some aspects for multiple links, a UE may configure dynamic resources with some underlying transmit/receive beam and half-duplex pattern. The transmitting UE may transmit the packet in the earliest dynamic resource (e.g., among the multiple links) that matches the underlying beam/half-duplex pattern. Additionally, UEs using a first link of the multiple links may convert dynamic resources from a second link between UEs to the first link, based at least in part on IUC messages. For example, dynamic resources identified for the second link may be used (e.g., copied) for the first link, and the information about the dynamic resources may be shared between UEs via IUC messages. By converting a resource into a dynamic resource, the beam/half duplex pattern may change for a UE.

There are three scenarios to be considered when a first link is to use dynamic resources of a second link. In a first scenario, the first and second links have the same receiving UE. The transmitting UE may ask the receiving UE to adjust its receive beam in advance. The transmitting UE of the second link may still transmit to the receiving UE, but the receiving beam does not match. In a second scenario, the first link and the second link have the same transmitting UE, but the transmitting UE may request the receiving UE to adjust its receive beam in advance. In a third scenario, the first link and the second link have two different pairs of sidelink nodes (e.g., UE A to UE B and UE C to UE D). For a narrow beam, this may not be an issue due to spatial reuse. In some aspects, frequency division multiplexing (FDM) may be used via some cross-link resource reservations.

As indicated above, FIG. 7 is provided as an example. Other examples may differ from what is described with regard to FIG. 7.

Figure 8:
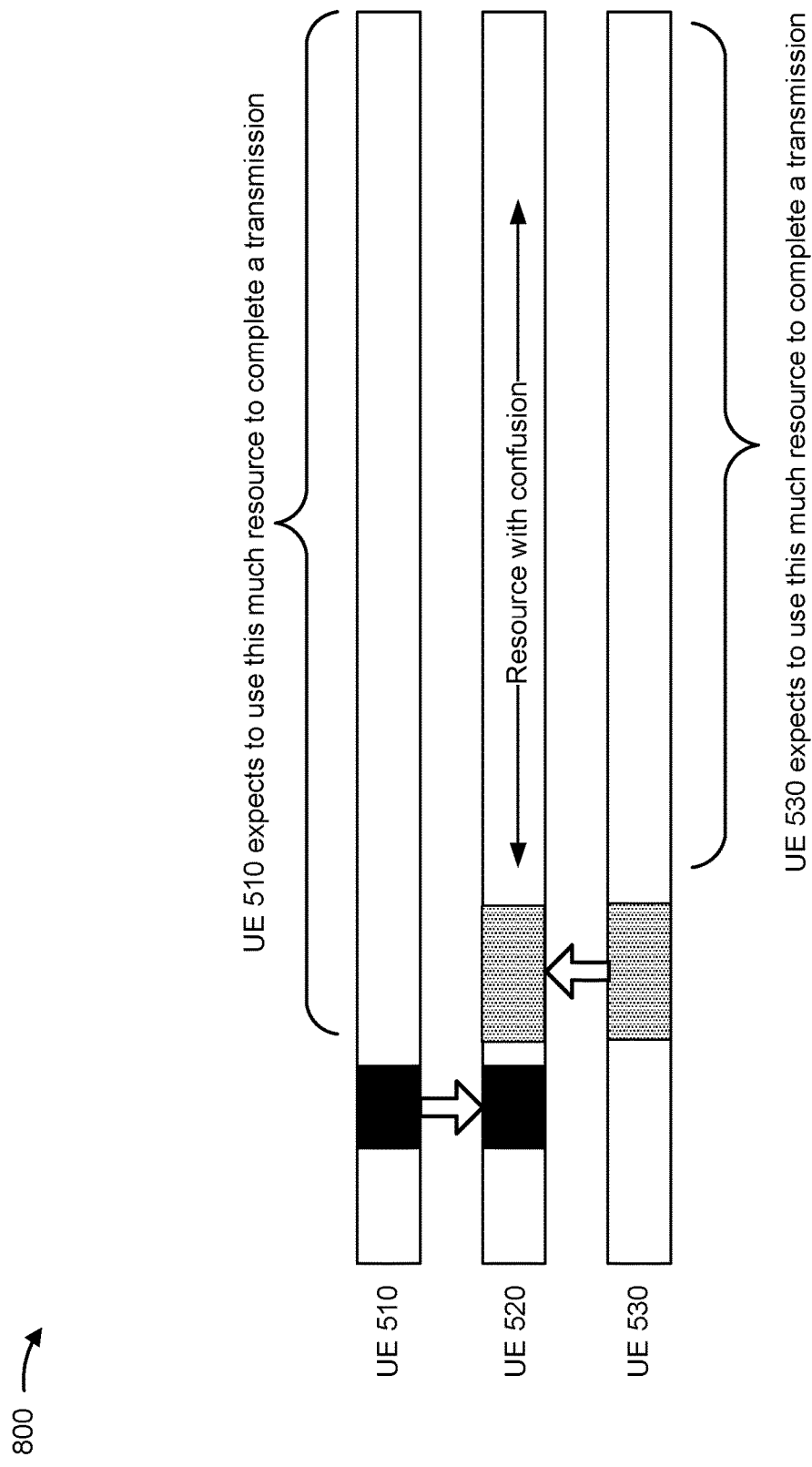
FIG. 8 is a diagram illustrating an example of extending a dynamic resource region, in accordance with the present disclosure.

FIG. 8 is a diagram illustrating an example 800 of extending a dynamic resource region, in accordance with the present disclosure.

In some aspects, a UE may renew or extend a dynamic resource region. In Uu discontinuous reception (DRX), a simple activity timer is used to renew resources. This is because a UE will only receive a grant from one network entity, so the activity timer is sufficient to extend the resource pool. But for FR2 sidelink, the activity timer is no longer sufficient because it is possible that multiple transmitting UEs intend to transmit to a receiving UE over the same set of resources.

In some aspects, a UE may establish and/or extend a dynamic resource region using a timer that is specific to the dynamic resource region. The dynamic resource region may extend (be available) for a time duration that is as long as the timer is running. The timer may start after the semi-static resource region and end after an expected amount of resources that are to be used for transmission. Example 800 shows amounts of resources in the dynamic resource region that are extended by a timer for UE 510 and UE 530. If UE 520 does not use such a timer, there may be confusion as to which resources are available in a dynamic resource region.

As indicated above, FIG. 8 is provided as an example. Other examples may differ from what is described with regard to FIG. 8.

Figure 9:
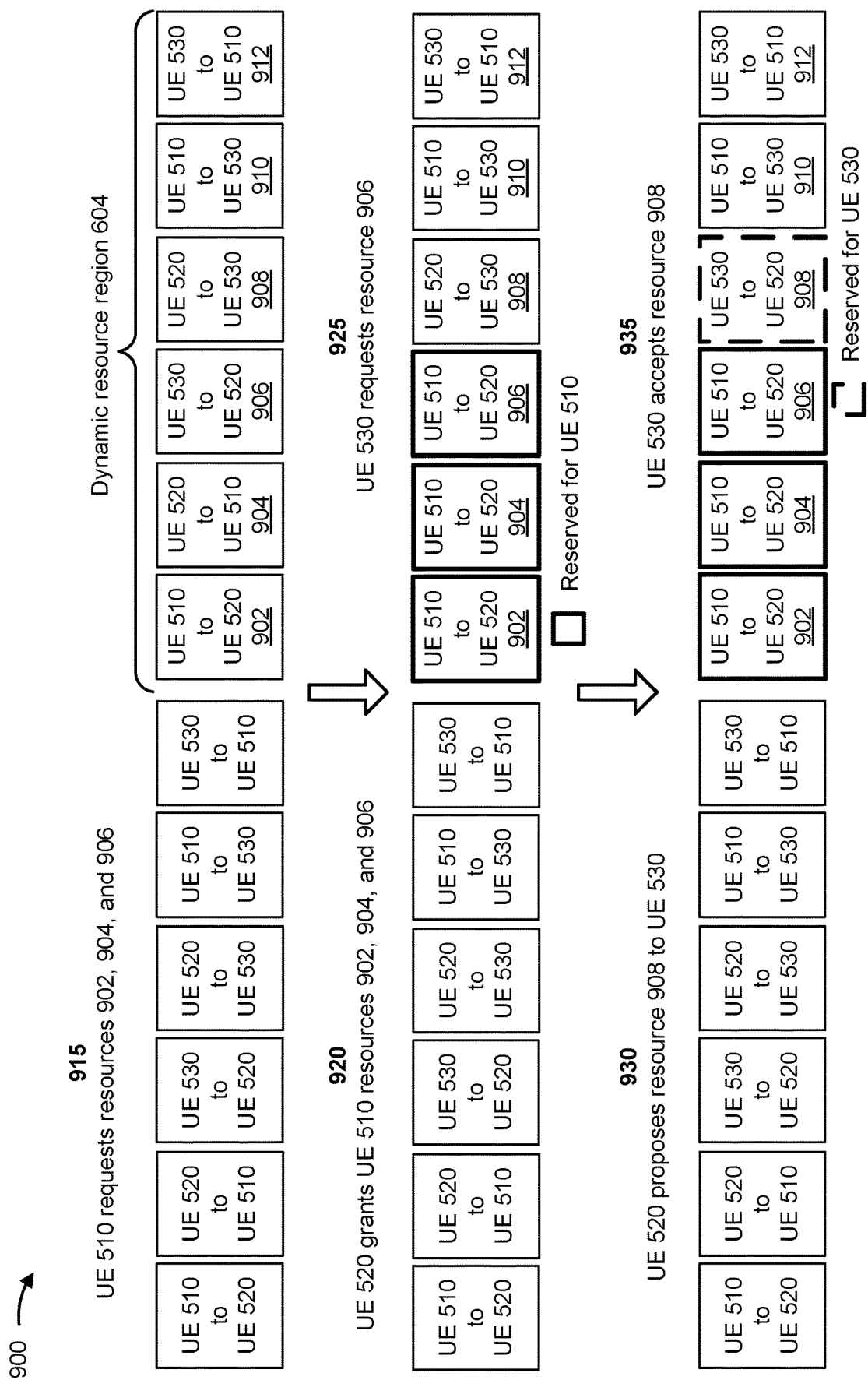
FIG. 9 is a diagram illustrating an example of using proposed resources, in accordance with the present disclosure.

FIG. 9 is a diagram illustrating an example 900 of using proposed resources, in accordance with the present disclosure.

In some aspects, to address dynamic resource collision issues, a UE may reserve additional dynamic resources and overwrite the underlying beam and half-duplex pattern for a link after an IUC procedure (exchange of IUC messages between UEs). Overwriting an existing pattern may reduce resource collisions among different links, from a receiver perspective. Example 900 shows a preconfigured beam and half-duplex pattern for the dynamic resource region 604. Within the dynamic resource region 604, resource 902 is for UE 510 to UE 520, resource 904 is for UE 520 to UE 510, resource 906 is for UE 530 to UE 520, resource 908 is for UE 520 to UE 530, resource 910 is for UE 510 to UE 530, and resource 912 is for UE 530 to UE 510.

As shown by reference number 915, UE 510 may request resources 902, 904, and 906 for transmission to UE 520, as part of an IUC procedure. The request may be via SCI-2 or a MAC CE. The request may include a quantity of additional slots, a quantity of subchannels, and/or preferred quasi-colocation (QCL) states of requested resources. The request may include a Layer 1 (L1) priority and/or a resource selection window (RSW) location. As shown by reference number 920, UE 520 may grant UE 510 resources 902, 904, and 906.

As shown by reference number 925, UE 530 may request resource 906 for transmission to UE 520. If the request is accepted, UE 530 may proceed with transmission in resource 906. However, UE 520 may have already granted resource 906 to UE 510. It may be helpful for UE 530 to know that resource 906 is not available (e.g., whether resource 906 is already committed by a semi-static configuration or whether the resource 906 has already been requested by and granted to another UE). If a transmitting UE knows the unavailable resource list, the request can either not include unavailable resources, or unavailable resources may be automatically excluded from a request. Of course, if the underlying beam/half-duplex pattern in the dynamic resource region 604 already aligns with UE 530's need to transmit its packet, UE 530 may not transmit such a request. Sending the request (via an IUC procedure in this case) provides additional protection for the preconfigured resources in the dynamic resource region 604 because a receiving UE may not grant the resource to another transmitting UE.

A receiving UE may transmit IUC information that indicates the acceptance of the resource proposal in the request or/and propose preferred/non-preferred resources associated with the QCL state(s). An SCI-2/MAC-CE/PSFCH resource may be used to indicate acknowledgement and/or propose preferred/non-preferred resources. As shown by reference number 930, UE 520 may propose resource 908 to UE 530. In some aspects, such a counter-proposal may include a subset of the resources in the original request. UE 520 may also indicate which resources are not available via non-preferred resources. As shown by reference number 935, UE 530 may accept the counter-proposal for resource 908. Alternatively, in some aspects, UE 530 may select another resource for another request. That is, UE 520 may overwrite the existing beam/half-duplex pattern for resources 904, 906, and 908 using an IUC procedure with requests and possible counter-proposals.

As indicated above, FIG. 9 is provided as an example. Other examples may differ from what is described with regard to FIG. 9.

Figure 10:
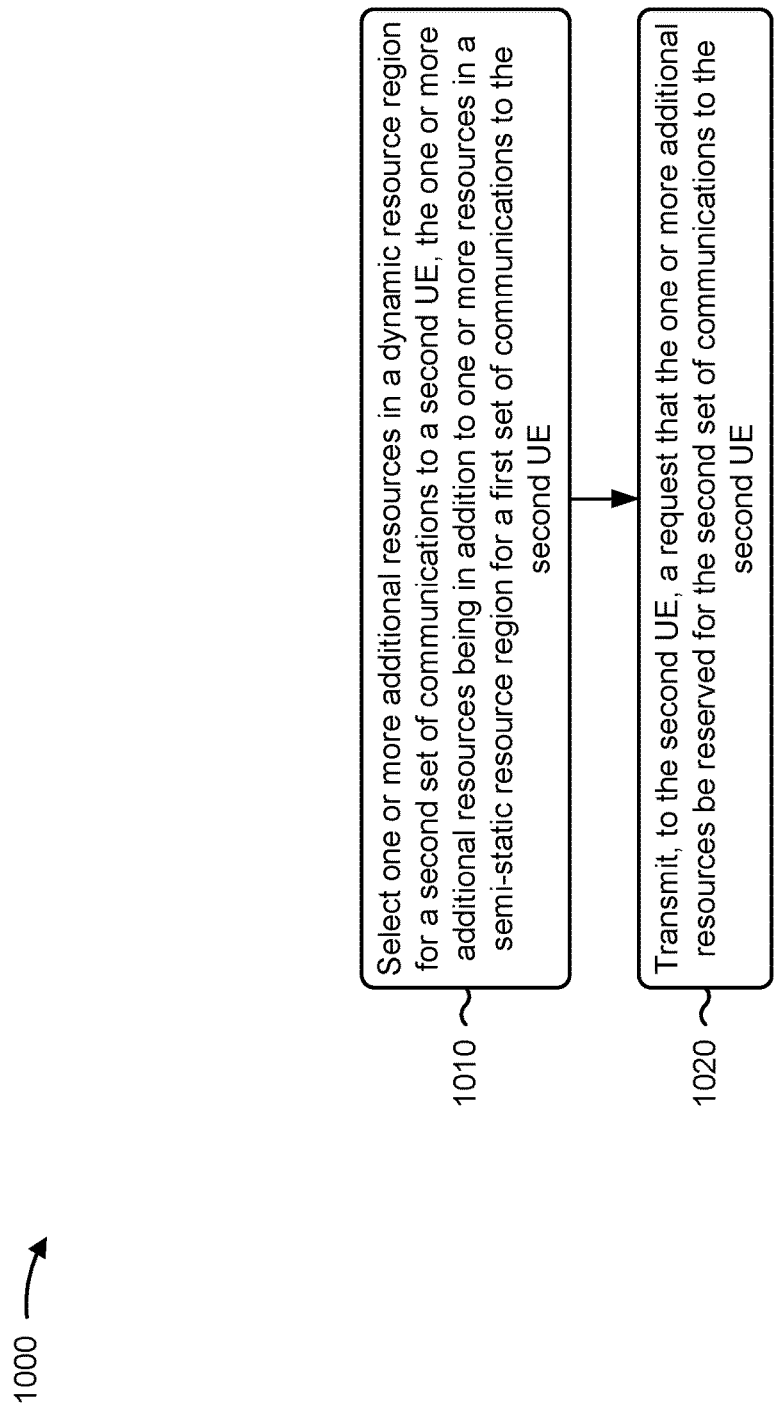
FIG. 10 is a diagram illustrating an example process performed, for example, by a first UE, in accordance with the present disclosure.

FIG. 10 is a diagram illustrating an example process 1000 performed, for example, by a first UE, in accordance with the present disclosure. Example process 1000 is an example where the first UE (e.g., UE 120, UE 510, UE 520, UE 530) performs operations associated with using dynamic resources for sidelink communication, such as in FR2.

As shown in FIG. 10, in some aspects, process 1000 may include selecting one or more additional resources in a dynamic resource region for a second set of communications to a second UE, the one or more additional resources being in addition to one or more resources in a semi-static resource region for a first set of communications to the second UE (block 1010). For example, the first UE (e.g., using communication manager 1206 depicted in FIG. 12) may select one or more additional resources in a dynamic resource region for a second set of communications to a second UE, the one or more additional resources being in addition to one or more resources in a semi-static resource region for a first set of communications to the second UE, as described above in connection with FIGS. 5-9.

As further shown in FIG. 10, in some aspects, process 1000 may include transmitting, to the second UE, a request that the one or more additional resources be reserved for the second set of communications to the second UE (block 1020). For example, the first UE (e.g., using transmission component 1204 and/or communication manager 1206 depicted in FIG. 12) may transmit, to the second UE, a request that the one or more additional resources be reserved for the second set of communications to the second UE, as described above in connection with FIGS. 5-9.

Process 1000 may include additional aspects, such as any single aspect or any combination of aspects described below and/or in connection with one or more other processes described elsewhere herein.

In a first aspect, the one or more resources in the semi-static resource region are located in FR2.

In a second aspect, alone or in combination with the first aspect, process 1000 includes receiving a response from the second UE that indicates that the request is granted.

In a third aspect, alone or in combination with one or more of the first and second aspects, process 1000 includes receiving a response from the second UE that indicates that the request is rejected.

In a fourth aspect, alone or in combination with one or more of the first through third aspects, process 1000 includes receiving a response from the second UE that indicates one or more proposed resources for the second set of communications that are different than the one or more additional resources indicated by the request, and transmitting a message that indicates acceptance of or rejection of the one or more proposed resources.

In a fifth aspect, alone or in combination with one or more of the first through fourth aspects, the message indicates acceptance of the one or more proposed resources, and process 1000 includes transmitting the second set of communications in the one or more proposed resources.

In a sixth aspect, alone or in combination with one or more of the first through fifth aspects, process 1000 includes transmitting a configuration that configures resources in the semi-static resource region with one or more of a beam pattern or a half-duplex pattern.

In a seventh aspect, alone or in combination with one or more of the first through sixth aspects, process 1000 includes transmitting a configuration that configures resources in the dynamic resource region with one or more of a beam pattern or a half-duplex pattern.

In an eighth aspect, alone or in combination with one or more of the first through seventh aspects, there are multiple links between the first UE and the second UE, and process 1000 includes transmitting a first communication of the second set of communications to the second UE in an earliest resource, of the dynamic resource region for the multiple links, that has a beam pattern that matches a beam pattern configured for the dynamic resource region or that has a half-duplex pattern that matches a half-duplex pattern configured for the dynamic resource region.

In a ninth aspect, alone or in combination with one or more of the first through eighth aspects, there are multiple links from the first UE, where a first link of the multiple links is between the first UE and the second UE, and process 1000 includes converting resources of a dynamic resource region of the first link to match resources of a dynamic resource region of a second link of the multiple links to the second UE.

In a tenth aspect, alone or in combination with one or more of the first through ninth aspects, there are multiple links from the first UE, where a first link of the multiple links is between the first UE and the second UE, and process 1000 includes converting resources of a dynamic resource region of the first link to match resources of a dynamic resource region of a second link, of the multiple links, to a third UE.

In an eleventh aspect, alone or in combination with one or more of the first through tenth aspects, there is a first link between the first UE and the second UE, and process 1000 includes converting resources of a dynamic resource region of the first link to match resources of a dynamic resource region of a second link between a third UE and a fourth UE.

In a twelfth aspect, alone or in combination with one or more of the first through eleventh aspects, process 1000 includes extending the dynamic resource region using a timer.

In a thirteenth aspect, alone or in combination with one or more of the first through twelfth aspects, process 1000 includes overwriting a configured beam pattern or a configured half-duplex pattern based at least in part on a response from the second UE.

In a fourteenth aspect, alone or in combination with one or more of the first through thirteenth aspects, the request indicates one or more of a quantity of additional slots, a quantity of subchannels, or one or more QCL states of the one or more additional resources.

In a fifteenth aspect, alone or in combination with one or more of the first through fourteenth aspects, the request indicates one or more of an L1 priority or a location of an RSW.

In a sixteenth aspect, alone or in combination with one or more of the first through fifteenth aspects, process 1000 includes limiting the first set of communications in the semi-static resource region to inter-UE communications and an amount of data that satisfies a threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
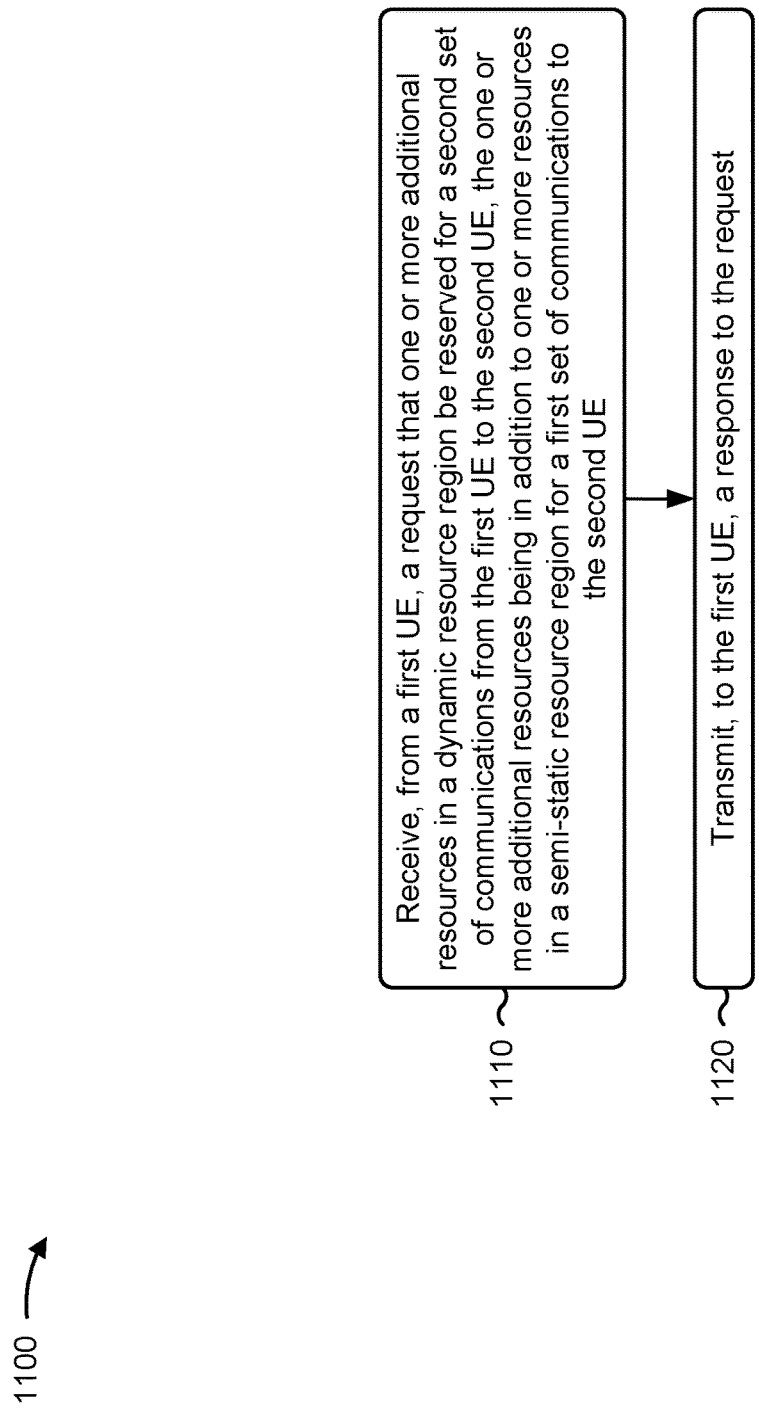
FIG. 11 is a diagram illustrating an example process performed, for example, by a second UE, in accordance with the present disclosure.

FIG. 11 is a diagram illustrating an example process 1100 performed, for example, by a second UE, in accordance with the present disclosure. Example process 1100 is an example where the second UE (e.g., UE 120, UE 510, UE 520, UE 530) performs operations associated with using dynamic resources for sidelink communication, such as in FR2.

As shown in FIG. 11, in some aspects, process 1100 may include receiving, from a first UE, a request that one or more additional resources in a dynamic resource region be reserved for a second set of communications from the first UE to the second UE, the one or more additional resources being in addition to one or more resources in a semi-static resource region for a first set of communications to the second UE (block 1110). For example, the second UE (e.g., using reception component 1202 and/or communication manager 1206 depicted in FIG. 12) may receive, from a first UE, a request that one or more additional resources in a dynamic resource region be reserved for a second set of communications from the first UE to the second UE, the one or more additional resources being in addition to one or more resources in a semi-static resource region for a first set of communications to the second UE, as described above in connection with FIGS. 5-9.

As further shown in FIG. 11, in some aspects, process 1100 may include transmitting, to the first UE, a response to the request (block 1120). For example, the second UE (e.g., using transmission component 1204 and/or communication manager 1206 depicted in FIG. 12) may transmit, to the first UE, a response to the request, as described above in connection with FIGS. 5-9.

Process 1100 may include additional aspects, such as any single aspect or any combination of aspects described below and/or in connection with one or more other processes described elsewhere herein.

In a first aspect, the response indicates that the request is granted.

In a second aspect, alone or in combination with the first aspect, the response indicates that the request is rejected.

In a third aspect, alone or in combination with one or more of the first and second aspects, process 1100 includes selecting one or more proposed resources that are different than the one or more additional resources indicated in the request, transmitting a response to the first UE that indicates the one or more proposed resources, and receiving a message that indicates acceptance of or rejection of the one or more proposed resources.

In a fourth aspect, alone or in combination with one or more of the first through third aspects, process 1100 includes receiving a configuration that configures resources in the semi-static resource region with one or more of a beam pattern or a half-duplex pattern.

In a fifth aspect, alone or in combination with one or more of the first through fourth aspects, process 1100 includes receiving a configuration that configures resources in the dynamic resource region with one or more of a beam pattern or a half-duplex pattern.

In a sixth aspect, alone or in combination with one or more of the first through fifth aspects, there are multiple links between the first UE and the second UE, and process 1100 includes receiving a first communication of the second set of communications to the second UE in an earliest resource, of the dynamic resource region for the multiple links, that has a beam pattern that matches a beam pattern configured for the dynamic resource region or that has a half-duplex pattern that matches a half-duplex pattern configured for the dynamic resource region.

In a seventh aspect, alone or in combination with one or more of the first through sixth aspects, process 1100 includes extending the dynamic resource region using a timer.

In an eighth aspect, alone or in combination with one or more of the first through seventh aspects, the request indicates one or more of a quantity of additional slots, a quantity of subchannels, or one or more QCL states of the one or more additional resources.

In a ninth aspect, alone or in combination with one or more of the first through eighth aspects, the request indicates one or more of an L1 priority or a location of an RSW.

In a tenth aspect, alone or in combination with one or more of the first through ninth aspects, process 1100 includes limiting the first set of communications in the semi-static resource region to inter-UE communications and an amount of data that satisfies a threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
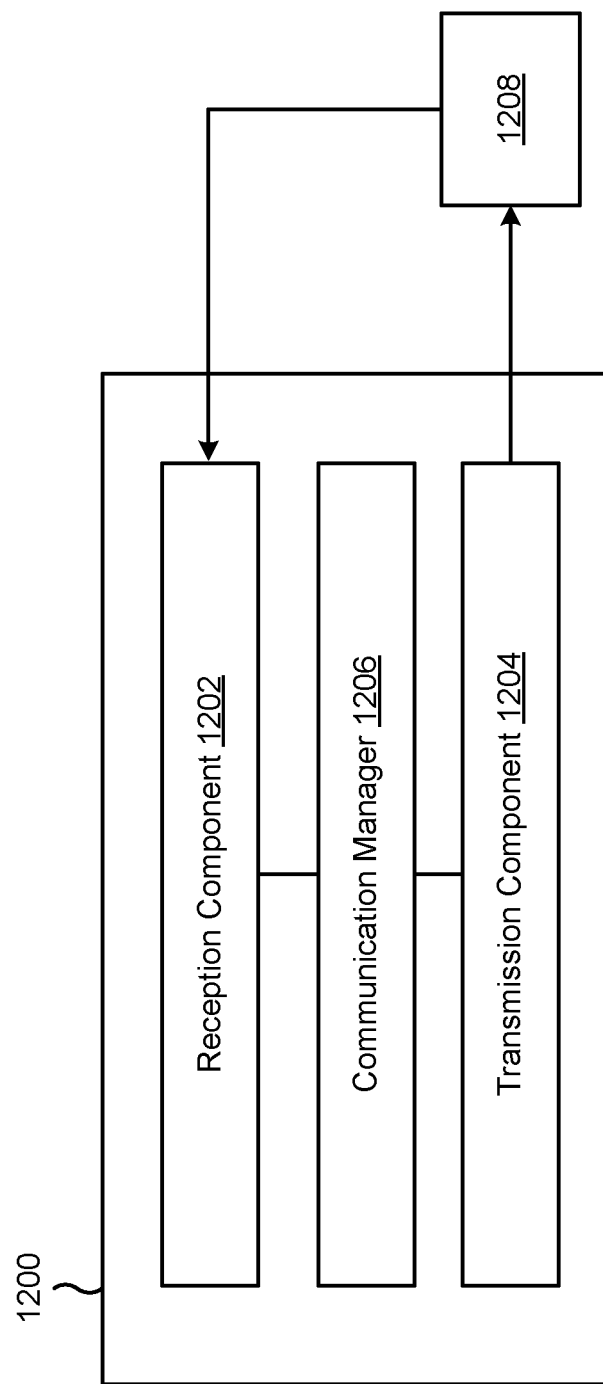
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a first UE or second UE (e.g., UE 120, UE 510, UE 520, UE 530), or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

In some aspects associated with a first UE, the communication manager 1206 may select one or more additional resources in a dynamic resource region for a second set of communications to a second UE, the one or more additional resources being in addition to one or more resources in a semi-static resource region for a first set of communications to the second UE. The transmission component 1204 may transmit, to the second UE, a request that the one or more additional resources be reserved for the second set of communications to the second UE.

The reception component 1202 may receive a response from the second UE that indicates that the request is granted. The reception component 1202 may receive a response from the second UE that indicates that the request is rejected. The reception component 1202 may receive a response from the second UE that indicates one or more proposed resources for the second set of communications that are different than the one or more additional resources indicated by the request. The transmission component 1204 may transmit a message that indicates acceptance of or rejection of the one or more proposed resources.

The transmission component 1204 may transmit a configuration that configures resources in the semi-static resource region with one or more of a beam pattern or a half-duplex pattern. The transmission component 1204 may transmit a configuration that configures resources in the dynamic resource region with one or more of a beam pattern or a half-duplex pattern.

The communication manager 1206 may extend the dynamic resource region using a timer. The communication manager 1206 may overwrite a configured beam pattern or a configured half-duplex pattern based at least in part on a response from the second UE. The communication manager 1206 may limit the first set of communications in the semi-static resource region to inter-UE communications and an amount of data that satisfies a threshold.

In some aspects associated with the second UE, the reception component 1202 may receive, from a first UE, a request that one or more additional resources in a dynamic resource region be reserved for a second set of communications from the first UE to the second UE, the one or more additional resources being in addition to one or more resources in a semi-static resource region for a first set of communications to the second UE. The transmission component 1204 may transmit, to the first UE, a response to the request.

The communication manager 1206 may select one or more proposed resources that are different than the one or more additional resources indicated in the request. The transmission component 1204 may transmit a response to the first UE that indicates the one or more proposed resources. The reception component 1202 may receive a message that indicates acceptance of or rejection of the one or more proposed resources.

The reception component 1202 may receive a configuration that configures resources in the semi-static resource region with one or more of a beam pattern or a half-duplex pattern. The reception component 1202 may receive a configuration that configures resources in the dynamic resource region with one or more of a beam pattern or a half-duplex pattern.

The communication manager 1206 may extend the dynamic resource region using a timer. The communication manager 1206 may limit the first set of communications in the semi-static resource region to inter-UE communications and an amount of data that satisfies a threshold.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: selecting one or more additional resources in a dynamic resource region for a second set of communications to a second UE, the one or more additional resources being in addition to one or more resources in a semi-static resource region for a first set of communications to the second UE; and transmitting, to the second UE, a request that the one or more additional resources be reserved for the second set of communications to the second UE.

Aspect 2: The method of Aspect 1, wherein the one or more resources in the semi-static resource region are located in frequency range 2 (FR2).

Aspect 3: The method of any of Aspects 1-2, further comprising receiving a response from the second UE that indicates that the request is granted.

Aspect 4: The method of any of Aspects 1-2, further comprising receiving a response from the second UE that indicates that the request is rejected.

Aspect 5: The method of any of Aspects 1-2, further comprising: receiving a response from the second UE that indicates one or more proposed resources for the second set of communications that are different than the one or more additional resources indicated by the request; and transmitting a message that indicates acceptance of or rejection of the one or more proposed resources.

Aspect 6: The method of Aspect 5, wherein the message that indicates acceptance of the one or more proposed resources, and wherein the method includes transmitting the second set of communications in the one or more proposed resources.

Aspect 7: The method of any of Aspects 1-6, further comprising transmitting a configuration that configures resources in the semi-static resource region with one or more of a beam pattern or a half-duplex pattern.

Aspect 8: The method of any of Aspects 1-7, further comprising transmitting a configuration that configures resources in the dynamic resource region with one or more of a beam pattern or a half-duplex pattern.

Aspect 9: The method of any of Aspects 1-8, wherein there are multiple links between the first UE and the second UE, and wherein the method includes transmitting a first communication of the second set of communications to the second UE in an earliest resource, of the dynamic resource region for the multiple links, that has a beam pattern that matches a beam pattern configured for the dynamic resource region or that has a half-duplex pattern that matches a half-duplex pattern configured for the dynamic resource region.

Aspect 10: The method of any of Aspects 1-9, wherein there are multiple links from the first UE, wherein a first link of the multiple links is between the first UE and the second UE, and wherein the method includes converting resources of a dynamic resource region of the first link to match resources of a dynamic resource region of a second link of the multiple links to the second UE.

Aspect 11: The method of any of Aspects 1-9, wherein there are multiple links from the first UE, wherein a first link of the multiple links is between the first UE and the second UE, and wherein the method includes converting resources of a dynamic resource region of the first link to match resources of a dynamic resource region of a second link, of the multiple links, to a third UE.

Aspect 12: The method of any of Aspects 1-9, wherein there is a first link between the first UE and the second UE, and wherein the method includes converting resources of a dynamic resource region of the first link to match resources of a dynamic resource region of a second link between a third UE and a fourth UE.

Aspect 13: The method of any of Aspects 1-12, further comprising extending the dynamic resource region using a timer.

Aspect 14: The method of any of Aspects 1-13, further comprising overwriting a configured beam pattern or a configured half-duplex pattern based at least in part on a response from the second UE.

Aspect 15: The method of any of Aspects 1-14, wherein the request indicates one or more of a quantity of additional slots, a quantity of subchannels, or one or more quasi-colocation states of the one or more additional resources.

Aspect 16: The method of any of Aspects 1-15, wherein the request indicates one or more of a Layer 1 priority or a location of a resource selection window.

Aspect 17: The method of any of Aspects 1-16, further comprising limiting the first set of communications in the semi-static resource region to inter-UE communications and an amount of data that satisfies a threshold.

Aspect 18: A method of wireless communication performed by a second user equipment (UE), comprising: receiving, from a first UE, a request that one or more additional resources in a dynamic resource region be reserved for a second set of communications from the first UE to the second UE, the one or more additional resources being in addition to one or more resources in a semi-static resource region for a first set of communications to the second UE; and transmitting, to the first UE, a response to the request.

Aspect 19: The method of Aspect 18, wherein the response indicates that the request is granted.

Aspect 20: The method of Aspect 18, wherein the response indicates that the request is rejected.

Aspect 21: The method of Aspect 18, further comprising: selecting one or more proposed resources that are different than the one or more additional resources indicated in the request; transmitting a response to the first UE that indicates the one or more proposed resources; and receiving a message that indicates acceptance of or rejection of the one or more proposed resources.

Aspect 22: The method of any of Aspects 18-21, further comprising receiving a configuration that configures resources in the semi-static resource region with one or more of a beam pattern or a half-duplex pattern.

Aspect 23: The method of any of Aspects 18-22, further comprising receiving a configuration that configures resources in the dynamic resource region with one or more of a beam pattern or a half-duplex pattern.

Aspect 24: The method of any of Aspects 18-23, wherein there are multiple links between the first UE and the second UE, and wherein the method includes receiving a first communication of the second set of communications to the second UE in an earliest resource, of the dynamic resource region for the multiple links, that has a beam pattern that matches a beam pattern configured for the dynamic resource region or that has a half-duplex pattern that matches a half-duplex pattern configured for the dynamic resource region.

Aspect 25: The method of any of Aspects 18-24, further comprising extending the dynamic resource region using a timer.

Aspect 26: The method of any of Aspects 18-25, wherein the request indicates one or more of a quantity of additional slots, a quantity of subchannels, or one or more quasi-colocation states of the one or more additional resources.

Aspect 27: The method of any of Aspects 18-26, wherein the request indicates one or more of a Layer 1 priority or a location of a resource selection window.

Aspect 28: The method of any of Aspects 18-27, further comprising limiting the first set of communications in the semi-static resource region to inter-UE communications and an amount of data that satisfies a threshold.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   a memory; and
   one or more processors, coupled to the memory, configured to:
   select one or more additional resources in a dynamic resource region for a second set of communications to a second UE, the one or more additional resources being in addition to one or more resources in a semi-static resource region for a first set of communications to the second UE; and
   transmit, to the second UE, a request that the one or more additional resources be reserved for the second set of communications to the second UE;
   receive a response from the second UE that indicates one or more proposed resources for the second set of communications that are different than the one or more additional resources indicated by the request; and
   transmit a message that indicates acceptance of or rejection of the one or more proposed resources.

2. The first UE of claim 1, wherein the one or more resources in the semi-static resource region are located in frequency range 2 (FR2).

3. The first UE of claim 1, wherein the one or more processors are configured to receive a response from the second UE that indicates that the request is granted.

4. The first UE of claim 1, wherein the one or more processors are configured to receive a response from the second UE that indicates that the request is rejected.

5. The first UE of claim 1, wherein the message indicates acceptance of the one or more proposed resources, and wherein the one or more processors are configured to transmit the second set of communications in the one or more proposed resources.

6. The first UE of claim 1, wherein the one or more processors are configured to transmit a configuration that configures resources in the semi-static resource region with one or more of a beam pattern or a half-duplex pattern.

7. The first UE of claim 1, wherein the one or more processors are configured to transmit a configuration that configures resources in the dynamic resource region with one or more of a beam pattern or a half-duplex pattern.

8. The first UE of claim 1, wherein there are multiple links between the first UE and the second UE, and wherein the one or more processors are configured to transmit a first communication of the second set of communications to the second UE in an earliest resource, of the dynamic resource region for the multiple links, that has a beam pattern that matches a beam pattern configured for the dynamic resource region or that has a half-duplex pattern that matches a half-duplex pattern configured for the dynamic resource region.

9. The first UE of claim 1, wherein there are multiple links from the first UE, wherein a first link of the multiple links is between the first UE and the second UE, and wherein the one or more processors are configured to convert resources of a dynamic resource region of the first link to match resources of a dynamic resource region of a second link of the multiple links to the second UE.

10. The first UE of claim 1, wherein there are multiple links from the first UE, wherein a first link of the multiple links is between the first UE and the second UE, and wherein the one or more processors are configured to convert resources of a dynamic resource region of the first link to match resources of a dynamic resource region of a second link, of the multiple links, to a third UE.

11. The first UE of claim 1, wherein there is a first link between the first UE and the second UE, and wherein the one or more processors are configured to convert resources of a dynamic resource region of the first link to match resources of a dynamic resource region of a second link between a third UE and a fourth UE.

12. The first UE of claim 1, wherein the one or more processors are configured to extend the dynamic resource region using a timer.

13. The first UE of claim 1, wherein the one or more processors are configured to overwrite a configured beam pattern or a configured half-duplex pattern based at least in part on a response from the second UE.

14. The first UE of claim 1, wherein the request indicates one or more of a quantity of additional slots, a quantity of subchannels, or one or more quasi-co-location states of the one or more additional resources.

15. The first UE of claim 1, wherein the request indicates one or more of a Layer 1 priority or a location of a resource selection window.

16. The first UE of claim 1, wherein the one or more processors are configured to limit the first set of communications in the semi-static resource region to inter-UE communications and an amount of data that satisfies a threshold.

17. A second user equipment (UE) for wireless communication, comprising:
a memory; and
one or more processors, coupled to the memory, configured to:
receive, from a first UE, a request that one or more additional resources in a dynamic resource region be reserved for a second set of communications from the first UE to the second UE, the one or more additional resources being in addition to one or more resources in a semi-static resource region for a first set of communications to the second UE;
transmit, to the first UE, a response to the request;
select one or more proposed resources that are different than the one or more additional resources indicated in the request;
transmit a response to the first UE that indicates the one or more proposed resources; and
receive a message that indicates acceptance of or rejection of the one or more proposed resources.

18. The second UE of claim 17, wherein the response indicates that the request is granted.

19. The second UE of claim 17, wherein the response indicates that the request is rejected.

20. The second UE of claim 17, wherein the one or more processors are configured to receive a configuration that configures resources in the semi-static resource region with one or more of a beam pattern or a half-duplex pattern.

21. The second UE of claim 17, wherein the one or more processors are configured to receive a configuration that configures resources in the dynamic resource region with one or more of a beam pattern or a half-duplex pattern.

22. The second UE of claim 17, wherein there are multiple links between the first UE and the second UE, and wherein the one or more processors are configured to receive a first communication of the second set of communications to the second UE in an earliest resource, of the dynamic resource region for the multiple links, that has a beam pattern that matches a beam pattern configured for the dynamic resource region or that has a half-duplex pattern that matches a half-duplex pattern configured for the dynamic resource region.

23. The second UE of claim 17, wherein the one or more processors are configured to extend the dynamic resource region using a timer.

24. The second UE of claim 17, wherein the request indicates one or more of a quantity of additional slots, a quantity of subchannels, or one or more quasi-co-location states of the one or more additional resources.

25. The second UE of claim 17, wherein the request indicates one or more of a Layer 1 priority or a location of a resource selection window.

26. The second UE of claim 17, wherein the one or more processors are configured to limit the first set of communications in the semi-static resource region to inter-UE communications and an amount of data that satisfies a threshold.

27. A method of wireless communication performed by a first user equipment (UE), comprising:
selecting one or more additional resources in a dynamic resource region for a second set of communications to a second UE, the one or more additional resources being in addition to one or more resources in a semi-static resource region for a first set of communications to the second UE;
transmitting, to the second UE, a request that the one or more additional resources be reserved for the second set of communications to the second UE;
receiving a response from the second UE that indicates one or more proposed resources for the second set of communications that are different than the one or more additional resources indicated by the request; and
transmitting a message that indicates acceptance of or rejection of the one or more proposed resources.

28. A method of wireless communication performed by a second user equipment (UE), comprising:
receiving, from a first UE, a request that one or more additional resources in a dynamic resource region be reserved for a second set of communications from the first UE to the second UE, the one or more additional resources being in addition to one or more resources in a semi-static resource region for a first set of communications to the second UE;
transmitting, to the first UE, a response to the request;

selecting one or more proposed resources that are different than the one or more additional resources indicated in the request;
transmitting a response to the first UE that indicates the one or more proposed resources; and
receiving a message that indicates acceptance of or rejection of the one or more proposed resources.

\* \* \* \* \*